US005784037A

United States Patent [19]
Inoue

[11] Patent Number: 5,784,037
[45] Date of Patent: Jul. 21, 1998

[54] DISPLAY SYSTEM

[75] Inventor: Hiroshi Inoue, Yokohama, Japan

[73] Assignee: Canon Kabushiki Kaisha, Tokyo, Japan

[21] Appl. No.: 304,816

[22] Filed: Sep. 13, 1994

Related U.S. Application Data

[63] Continuation of Ser. No. 959,461, Oct. 9, 1992, abandoned, which is a continuation of Ser. No. 480,570, Feb. 15, 1990, abandoned.

[30] Foreign Application Priority Data

Sep. 1, 1989 [JP] Japan ............... 1-226632

[51] Int. Cl.⁶ .......................................... G09G 3/36
[52] U.S. Cl. ........................... 345/87; 345/132; 345/127
[58] Field of Search ...................... 345/87, 94, 84, 345/55, 97, 99, 101, 208, 132, 127; 359/54, 56; 348/790, 792; 349/19, 33, 41, 54

[56] References Cited

U.S. PATENT DOCUMENTS

| 4,338,600 | 7/1982 | Leach ............... 340/765 |
| 4,536,856 | 8/1985 | Hiroishi ............. 364/900 |
| 4,684,936 | 8/1987 | Brown et al. ........ 340/721 |
| 4,779,086 | 10/1988 | Kanno et al. ....... 340/805 |
| 4,795,239 | 1/1989 | Yamashita et al. ... 350/333 |
| 4,830,467 | 5/1989 | Inoue et al. ........ 350/333 |
| 4,902,107 | 2/1990 | Tsuboyama et al. .. 340/784 |
| 4,922,241 | 5/1990 | Inoue et al. ........ 340/784 |
| 4,930,875 | 6/1990 | Inoue et al. ........ 350/333 |
| 4,948,232 | 8/1990 | Lange .............. 340/784 |
| 4,990,902 | 2/1991 | Zenda .............. 340/731 |
| 4,990,904 | 2/1991 | Zenda .............. 340/799 |
| 4,998,100 | 3/1991 | Ishii ............... 340/784 |

FOREIGN PATENT DOCUMENTS

| 0254561 | 1/1988 | European Pat. Off. . |
| 0256879 | 2/1988 | European Pat. Off. . |
| 0271280 | 6/1988 | European Pat. Off. . |
| 0289144 | 11/1988 | European Pat. Off. . |
| 0295689A3 | 12/1988 | European Pat. Off. . |
| 0295691A3 | 12/1988 | European Pat. Off. . |
| 0295692A3 | 12/1988 | European Pat. Off. . |
| 2214342A | 8/1989 | United Kingdom . |

*Primary Examiner*—Dennis-Doom Chow
*Attorney, Agent, or Firm*—Fitzpatrick, Cella, Harper & Scinto

[57] ABSTRACT

A display system using a display panel in which scan signal electrodes and information signal electrodes are arranged like a matrix and a liquid crystal having a memory characteristic is sandwiched between both of the electrodes. Scan signals and information signals are respectively applied to the scan signal electrodes and the information signal electrodes to thereby drive said electrodes. The display system includes a memory for storing image data to be displayed by the display panel, a display mode memory for storing the driving condition defining a display mode with respect to the image data to be displayed by the display panel, and a display controller for reading out the image data to be displayed from the memory, for controlling a drive controller in accordance with the memory stored display mode.

44 Claims, 8 Drawing Sheets

FIG. 7

| RATIO | | COLOR |
|---|---|---|
| 1 | [3|2] | 4 |
| 2 | 2×2 grid of pairs (first pair: 3,2) | 8 |
| 4 | 4×4 grid of pairs (first pair: 3,2) | 16 |

FIG. 8

TABLE 1      SPECIFICATION OF MULTISYNC 4D AND 5D

DISPLAY MODE PREVIOUSLY STORED IN MEMORY:

| HORIZONTAL SCAN FREQ. | VERTICAL SCAN FREQ. | COLOR | TYPE OF ADAPTER | THE NUMBER OF PIXELS |
|---|---|---|---|---|
| 30.4KHz | 60Hz | UNLIMITED | IBM PGC | 640×480 |
| 31.5KHz | 60/70Hz | UNLIMITED | IBM MCGA, VGA | 640×480 |
| 35.0KHz | 66.7Hz | UNLIMITED | MACHINTOSH II VIDEO CARD | 640×480 |
| 35.2KHz | 56.0Hz | UNLIMITED | SUPER VGA | 800×600 |
| 35.5KHz | 43.5Hz | UNLIMITED | IBM 8514/A (INTERLACED) | 1024×768 |
| 48.0KHz | 60/70Hz | UNLIMITED | 1024×768 (NON-INTERLACED) | 1024×768 |
| 64.0KHz | 60Hz | UNLIMITED | 1280×1024 (NON-INTERLACED) | 1280×1024 |

FIG. 9

TABLE 2   SUPPORT MODE LIST (IBM MODE)

1. ALPHANUMERIC MODE

| MODE | ADAPTER | CHARACTERS | PIXELS | CHAR-SIZE | COLOR | B/P | PAGES | RATIO |
|---|---|---|---|---|---|---|---|---|
| 0, 1 | VGA(CGA) | 40×25 | 320×200 | 8×8 | 16 | 4 | 8 | 1,2,4 |
| 0*, 1* | VGA(350) | 40×25 | 320×350 | 8×14 | 16/64 | 4 | 8 | 1,2 |
| 0+, 1+ | VGA(400) | 40×25 | 360×400 | 9×16 | 16/256 | 4 | 8 | 1,2 |
| 2, 3 | VGA(CGA) | 80×25 | 640×200 | 8×8 | 16 | 4 | 8 | 1,2 |
| 2*, 3* | VGA(CGA) | 80×25 | 640×350 | 8×14 | 16/64 | 4 | 8 | 1,2 |
| 0+, 1+ | VGA(CGA) | 80×25 | 720×400 | 9×16 | 16/256 | 4 | 8 | 1 |
| 7* | VGA(350) | 80×25 | 720×350 | 9×14 | MONO | 1 | 8 | 1 |
| 7+ | VGA(400) | 80×25 | 720×400 | 9×16 | MONO | 1 | 8 | 1 |

2. GRAPHICS MODE

| MODE | ADAPTER | RESOLUTION | COLOR | B/P | CHAR-SIZE | RATIO |
|---|---|---|---|---|---|---|
| 4, 5 | VGA(CGA) | 320×200 | 4 | 2 | 8×8 | 1,2,4 |
| 6 | VGA(CGA) | 640×200 | 2 | 1 | 8×8 | 1,2 |
| D | VGA(CGA+) | 320×200 | 16 | 4 | 8×8 | 1,2,4 |
| E | VGA(CGA+) | 640×200 | 16 | 4 | 8×8 | 1,2 |
| F | VGA(EGA) | 640×350 | 4 | 2 | 8×14 | 1,2 |
| 10 | VGA(EGA+) | 640×350 | 16 | 4 | 8×8 | 1,2 |
| 11 | VGA | 640×480 | 2 | 1 | 8×16 | 1,2 |
| 12 | VGA | 640×480 | 16 | 4 | 8×16 | 1,2 |
| 13 | VGA | 320×200 | 256 | 8 | 8×8 | 1,2,4 |

NUMBERS (1, 2, 4) OF RATIO REPRESENT EXPRESSIONABLE GRADIENT LEVELS, 1→4 LEVELS, 2→8 LEVELS AND 4→16 LEVELS

DISPLAY SYSTEM

This application is a continuation, of application Ser. No. 07/959,461 filed Oct. 9, 1992, now abandoned which is a continuation of application Ser. No. 07/480,570 filed Feb. 15, 1990, now abandoned.

BACKGROUND OF THE INVENTION

1. Field of the Invention

The present invention relates to a display system to display image data using a liquid crystal display panel in which scan signal lines and information signal lines are arranged like a matrix and a liquid crystal having a memory characteristic sandwiched between the scan signal lines and the information signal lines.

2. Related Background Art

Recently, in displays such as liquid crystal display devices and the like which are required for personal computers, work stations, and the like, the screen size and the resolution has increased yearly. Accordingly, improved compatibility with conventional displays is also needed. For instance, an IBM PC/AT personal computer may utilize several display modes in order to display due to CGA (Color Graphics Adapter), EGA (Enhanced Graphics Adapter), VGA (Video Graphics Adapter), 8514/A, etc. as specifications of adapters for images. The resolution of these various display modes and the numbers of expressionable colors, and the like differ.

A CRT such as Multisync II, Multisync 3D, 4D, or 5D made by NEC Ltd., or the like has been konwn as a product in which it is possible to display in many display modes by a single display. For instance, Table 1 in FIG. 8 shows video modes (display modes) which are supported by the Multisync 4D and 5D.

Comparatively, the fundamental operating principle of the display having the memory characteristic such as a ferroelectric liquid crystal display or the like differs from various fundamental operation principles which are used in the conventional displays such as CRT, STN-LCD (super twisted liquid crystal display), and PDP (plasma display). Therefore, the partial writing scanning method using the memory characteristic which has been proposed by Kanbe et al. in U.S. Pat. No. 4,655,561 is intended to be realized by combining "low frame frequency driving + partial writing scanning" to execute the display at a high resolution by the liquid crystal display having the memory characteristic described in JP-A-63-65494, or JP-A-285141 proposed by the inventors et al. of the present invention.

However, a new driving method is obviously necessary to meet the request to support the foregoing various display modes using a liquid crystal display having the memory characteristic such as a ferroelectric liquid crystal display (FLC display). Therefore, such a request cannot be realized by the conventional methods. There is proposed a total control method which allows the user to use either one of the various display modes from the turn-on of a power source by using the ferroelectric liquid crystal display coupled to a computer to change the display mode as necessary is proposed.

A method of realizing the above object of the present invention will now be clarified hereinbelow by providing a whole construction and its control method for supporting various display modes for use in, particularly, the IBM PC/AT and more generally for supporting a high precision mode of a resolution of 1280 (dots)×1024 (dots) by using the ferroelectric liquid crystal display as an example.

The ferroelectric liquid crystal display maintaining a memory characteristic and temperature dependent driving conditions is represented in FIG. 2. In the example, FIG. 2 shows that a frame frequency is set to 7 Hz at 10° C., 10 Hz at 25° C., and 20 Hz at 40° C. (the number of scan lines: 1024, driving voltage: 24 V, KMT-408 made by Nippon Nitrogen Co., Ltd. was used). Thus, in the case of 10° C. at the time of turn-on of the power source, the flicker can be prevented by an interlacing process of eight scan lines in the low frame frequency driving which has already been proposed. However, if the environmental temperature of the display rose together with the start of the operation, for instance, if the environmental temperature rose due to the heating by the back light or the forced use of an external heater or the like, assuming that the temperature rose to 25° C., the flicker can be sufficiently prevented by executing the interlacing process of four scan lines. Further, a division phenomenon of the display screen upon display of an animation screen, for instance, upon scroll display or the like, the only one drawback in the interlacing eight scan lines can be also reduced. Moreover, even at the same temperature, the driving method further changes depending on the video mode. For instance, in the FLC display at 10 Hz in the foregoing display mode of 1024 scan lines in Table 1 in FIG. 8, the number of scan lines is set to 480 in the VGA display mode and the frame frequency is set to 20 Hz or higher. The flicker can be sufficiently prevented by the ordinary (two scan lines) interlacing process and the division of the screen upon animation can be further reduced. However, according to the conventional method, although a method of determining the display mode exists, a method which can change the frame frequency of the display together with the environmental temperature of the display does not exist.

On the other hand, since the FLC display is the X-Y matrix display as mentioned above, the change in number of pixels depending on the display mode cannot be realized by simply changing the beam frequency of the CRT display. The physical number of pixels in the X-Y matrix display is unconditionally determined at the time of production and cannot be changed. Therefore, it is necessary to convert the logic number of pixels which is required in the display mode into the physical number of pixels.

Further, in the case where the color which can be displayed on the display side and the number of gradient levels do not coincide with those of the input data. For instance, in the case where in spite of monochrome fact that the display side has the display performance and eight gradient levels, the input data side requested 256 gradient levels with respect to each of R, G, and B, the relations among the colors and the numbers of gradient levels of the input data and output data must be previously determined in correspondence to each display mode.

Generally, as shown in FIG. 3, an effective display area and an external frame portion of the effective display area exist in the display area on the display. The portion which is surrounded by a point $(x_1, y_1)$ and a point $(x_2, Y_2)$, defining a square away from the physical coordinate origin $(x_0, y_0)$ on the display is used as an effective display screen. The logic screen area which is required by the display mode is set to the effective display area. In the case of assuring the VGA display mode area of 640 (in the x direction)×480 (in the y direction) in the physical screen display of 1280 (x direction)×1024 (y direction), the following two cases are considered where the external frame sizes differ.

Case 1:
   Logical one pixel = Physical one pixel
   $(x_1, y_1)=(319, 271)$
   $(x_2, y_2)=(959, 751)$
Case 2:
   Logical one pixel = Physical two pixels
   $(x_1, y_1)=(0, 31)$
   $(x_2, y_2)=(1279, 991)$ It should be noted that even if no image data exists, the external frame portion of the effective display portion of the display having the memory characteristic, such as an FLC display, must be driven by predetermined display data and such a point is different from the conventional display. Due to the memory characteristic, the drive data is also transferred to the frame portion, the display state of the frame portion is not aligned to, for instance, either white or black because of the memory characteristic. Therefore, when the display mode is decided, the size, color, and gradient level of the frame portion must be determined and in addition to the image data, the frame portion drive data must be generated for display.

On the other hand, when the display which is connected has two functions for the ordinary CRT or the like and for the FLC display, if the user desires to display in full colors even if the space utility is sacrificed. Accordingly, the system must be constructed in a manner such that when the user changes the connection to exchange the display or the like, the data transfer method and data transfer format of a graphics adapter can be changed. The data transfer method and data transfer format of the FLC display in the foregoing patent essentially differ from those of the conventional CRT or the like.

On the other hand, in the case where the driving conditions of the FLC display are not fully satisfied, for instance, when the environmental temperature does not reach a value in the display operating temperature range, the generation of the image data is also postponed by sending a wait request from the display side to the image data generating side. On the other hand, if the user wants to return the display mode to the display mode displayed prior to reset, it is necessary to reconstruct the previous state of those various control and drive parameters before resetting and, if necessary, the image data as well can be read out.

Even if individually preparing the means for satisfying the necessary conditions as mentioned above, it is desirable that the user can actually easily make a change on the basis of a predetermined procedure not only at the time of turn-on of the power source but also upon operation. Unless otherwise, each time the display mode is changed and used, the power source must be shut off and turned on or the system reset.

Particularly, when changing the display mode which has been previously set, there is a case where it is insufficient even when the display mode is merely reset to a new display mode. For instance, it is assumed that the display mode has been set to the VGA mode and is reset to the EGA display mode by a certain application software request. When the user tries to reset the display mode to the inherent VGA mode after completion of the application software, if the various FLC VGA display control parameters is changed have not been stored in some memory area, the display cannot be returned to the VGA mode. In such a case, the previous image data would need to be again developed. Therefore, the control or drive parameters of the FLC display and the image data before conversion need to be read out in accordance with a predetermined programming.

Since the FLC display has the memory characteristic, attention needs to be paid upon turn-on, resetting, and turn-off of the power source. For instance, with respect to the orientation control of the FLC display, if the supply of a DC voltage is not properly controlled, prolonged orientation deterioration and an after-image or "sticking" phenomenon occur. Therefore, a drive control circuit must be designed so as to avoid such a DC voltage supply problem upon turn-on or turn-off of the power source. However, when the drive control circuit is integrated with a computer, in many cases, generally, the power source is supplied from the main body side and the power source is also turned on or off by the user from the main body side. Therefore, it is necessary that the power on/off state initiated from the user side be sent to the drive control circuit of the FLC display and a predetermined on/off control necessary for the FLC display is executed and, thereafter, the ordinary power on/off control is performed.

To manufacture a computer product having the FLC display which satisfies the foregoing necessary requirements, it is necessary to prepare a ROM (called an ROM BIOS) in which the necessary parameters have previously been programmed in accordance with the product. The ROM BIOS actually acts as the interface between the control and display of the computer main body and FLC display. The user can control the display mode or the like without needing the detailed knowledge, particularly, to control and drive the FLC display.

SUMMARY OF THE INVENTION

It is the first object of the invention to provide a display system using a liquid crystal display panel having the memory performance, in which the image display can be totally controlled in accordance with various display modes.

The second object of the invention is to provide a display system using a liquid crystal display panel having the memory performance, in which driving conditions of the liquid crystal display panel can be properly determined upon turn-on or resetting of a power source of the system.

The third object of the invention is to provide a display system using a liquid crystal display panel having the memory performance, in which driving conditions of the liquid crystal display panel can be properly determined in correspondence to a change in environmental temperature.

The fourth object of the invention is to provide a display system using a liquid crystal display panel having the memory performance, in which information necessary to drive the liquid crystal display panel is previously stored as display modes in memory means and the liquid crystal display panel is driven and controlled in accordance with the display mode.

The fifth object of the invention is to provide a display system using a liquid crystal display panel having the memory performance, in which the user can totally control the image display in accordance with various display modes under control of a host computer.

BRIEF DESCRIPTION OF THE DRAWINGS

FIG. 7 is a diagram showing the relation between the physical pixels and the logic pixels in the display area of a ferroelectric liquid crystal display according to the invention;

FIG. 8 is a diagram of a Table 1 showing schematic functions of the Multisync 4D and 5D (trade names) made by NEC Ltd. having the representative display mode switching function among CRTs; and FIG. 9 is a diagram of a Table 2 showing an outline of functions and a part of driving conditions of the FLC display upon support of various CRT graphics modes based on IBM Corporation among display modes which the FLC display system has according to the invention.

DETAILED DESCRIPTION OF THE PREFERRED EMBODIMENTS

Figure 1:
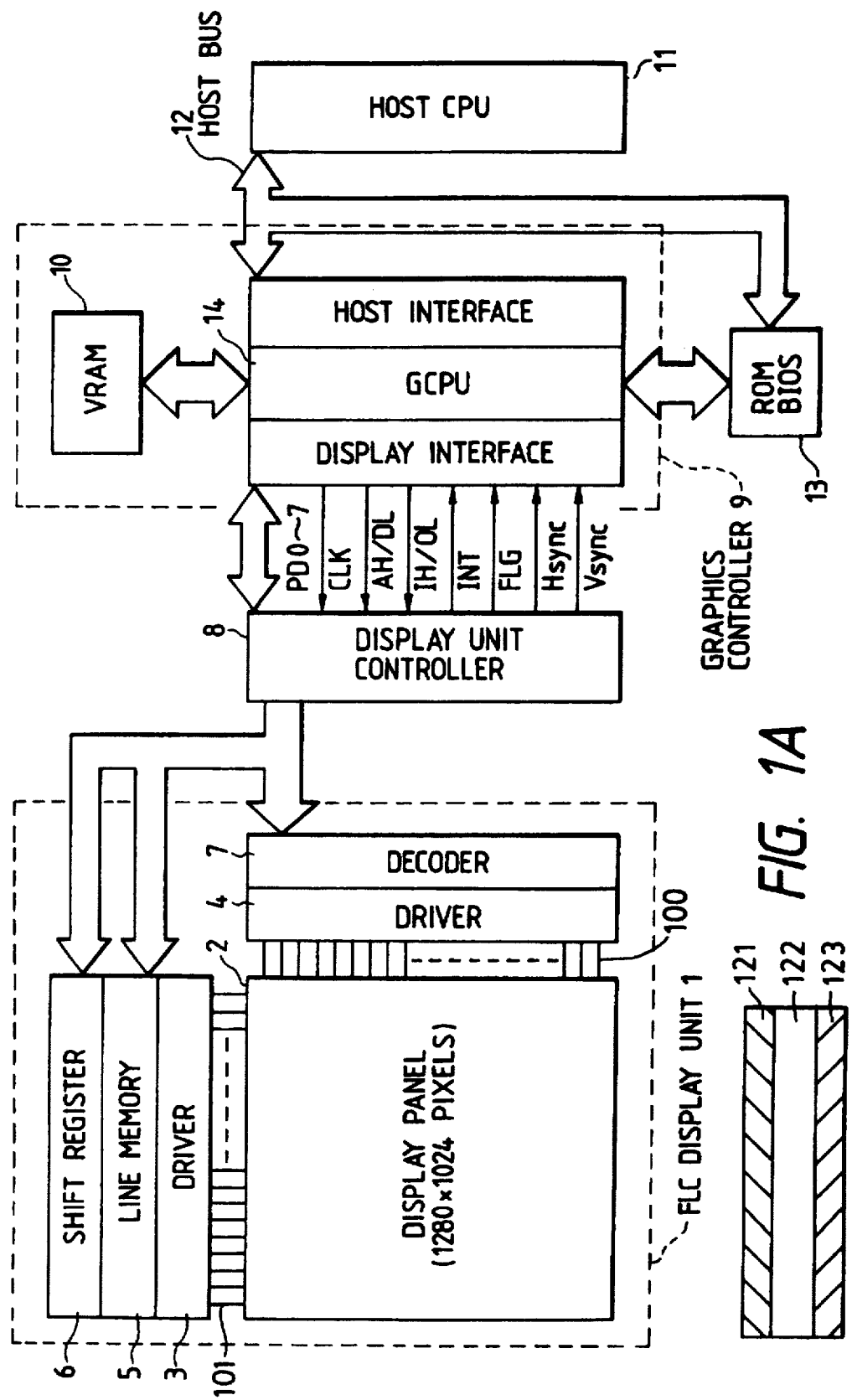
FIG. 1 is a diagram showing a whole construction including a display, a main apparatus, and an ROM BIOS according to the present invention.
Figure 1A:
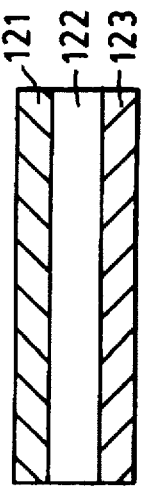
FIG 1A is a schematic representation of a cross-section of the display panel.
Figure 2:
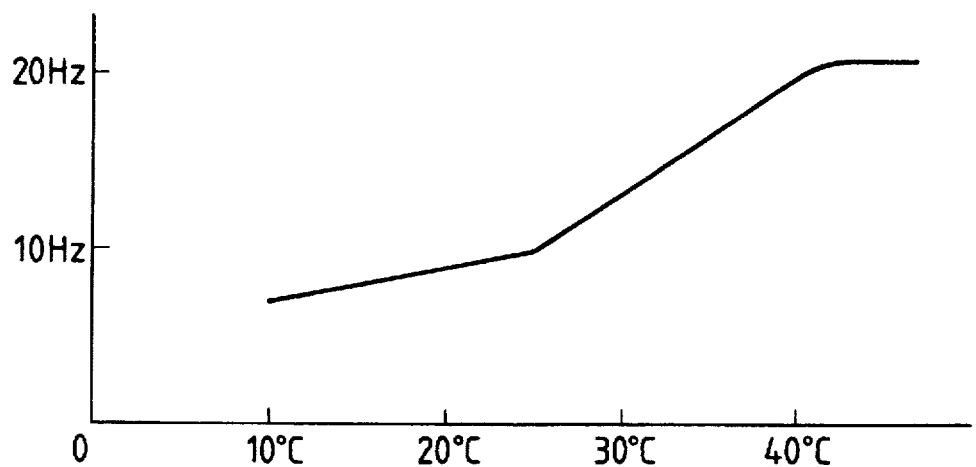
FIG. 2 is a graph showing a temperature dependency of a frame frequency as one of driving conditions of an FLC display unit.
Figure 3:
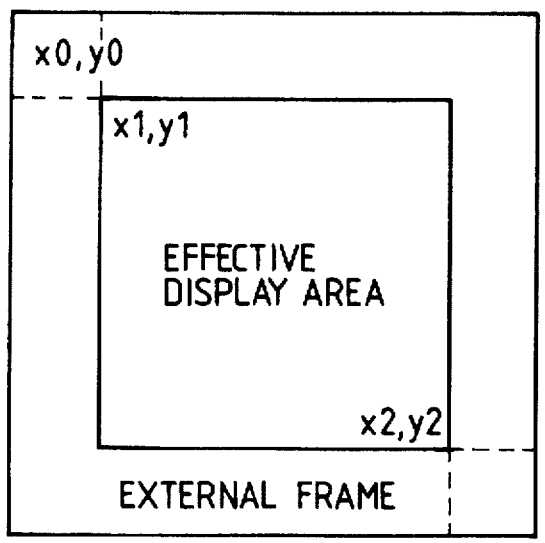
FIG. 3 is a diagram showing the relation between an effective display area and an external frame portion in the display unit.

FIG. 1 shows a hardware construction of a display panel 2 (1280×1024 pixels), display drivers 3 and 4, for driving electrodes 100 and 101 a display unit controller 8, and a graphics controller 9 having a VRAM 10 as an image data storage memory which construct a display system using a ferroelectric liquid crystal display according to an embodiment of the present invention. FIG. 1 also shows a hardware construction of a host CPU 11 and a host bus 12 showing the PC/AT machine made by IBM Corporation. FIG. 1 also shows an ROM BIOS 13 having therein a whole control monitor program as the present invention. FIG. 1A is a schematic cross-sectional view of the display panel illustrating the liquid crystal 122, disposed between an upper surface 121 and a lower surface 123.

(1) Functions of signal lines

The functions of signal lines provided between the host CPU 11 and the graphics controller 9 in FIG. 1 will now be described hereinbelow.

Host bus:
Standard interface hardware bus which is specified by IBM Corporation and is called an AT bus in the PC/AT machine made by IBM Corporation.

In FIG. 1, the functions of the signal lines provided between the FLC display unit controller 8 and the graphics controller 9 will now be described herein-below.

1) $PD_0$ to $PD_7$:
Data buses. Bidirectional buses of eight bits. Data transfer rate is 10 MHz/8 bits.

2) CLK:
Transfer clocks. 20 MHz.

3) AH/DL:
ID signal between the drive data and the video data. High level in the case of the drive data. Low level in the case of the video data.

4) IH/OL:
Input/output ID signal of the data bus.
When the data buses $PD_0$ to $PD_7$ are set into the input mode when they are seen from the graphics controller, High level.

When they are set into the output mode, Low level.

5) INT:
Interruption signal from the display side to the graphics controller.

6) FLG:
Data output permission signal from the display side to the graphics controller.
When the output is permitted, High level.

7) Hsync:
Horizontal sync signal. Data reception permission signal from the display side to the graphics controller.

8) Vsync:
Vertical sync signal. Sync signal for each display screen.

(2) Fundamental operaiton

The function which was defined in the ROM BIOS 13 is called from the video data generating side, that is, from the host CPU 11 side in accordance with a predetermined calling rule. If necessary, parameters which are necessary to realize the function are transmitted to the graphics controller 9. If the function was called by a normal procedure, in order to realize the requested function, the translation is made by a GCPU (graphics control central processing unit) 14 or the graphics controller 9 is directly accessed. The contents and the outline of the operations in the case of translation or direct access operative will now be practically explained hereinbelow.

The graphics controller 9 transfers the drive data and video data to the FLC display unit by use of bidirectional data buses $PD_0$ to $PD_7$. However, to transmit the drive data and video data by the same transmission path, the two kinds of data must be distinguished. An AH/DL signal is used to distinguish time. When the AH/DL signal is set to the High level, the data on the $PD_0$ to $PD_7$ indicates the "drive data". If the AH/DL signal is at the low level, the data indicates the "video data".

The FLC display unit controller 8 extracts the drive data from the video signal with the drive data which is transferred on the $PD_0$ to $PD_7$ and executes the process based on the drive data. On the other hand, the video data is sent to a shift register 6 on the information electrode drive circuit side on the basis of transfer clocks.

On the other hand, in the embodiment, since the FLC driving and display and the generation of the drive data and video data in the graphics controller 9 are asynchronously executed, it is necessary to synchronize the apparatuses upon transmission of the display data. The signals Hsync and Vsync are used to realize such synchronization. The Hsync signal is generated in the FLC display unit controller 8 every horizontal scan period, while the Vsync signal is generated in the controller 8 every vertical scan period upon refreshing. The Hsync and Vsync signals are sent to the graphics controller 9. The graphics controller 9 always monitors the Hsync and Vsync signals. When the Vsync signal is at the High level and the Hsync signal is at the Low level, the display data (drive data + video data) is transferred. In the other cases, after completion of the transfer of the one display data, the graphics controller 9 waits until the next transfer permission signal is input.

Figure 4:
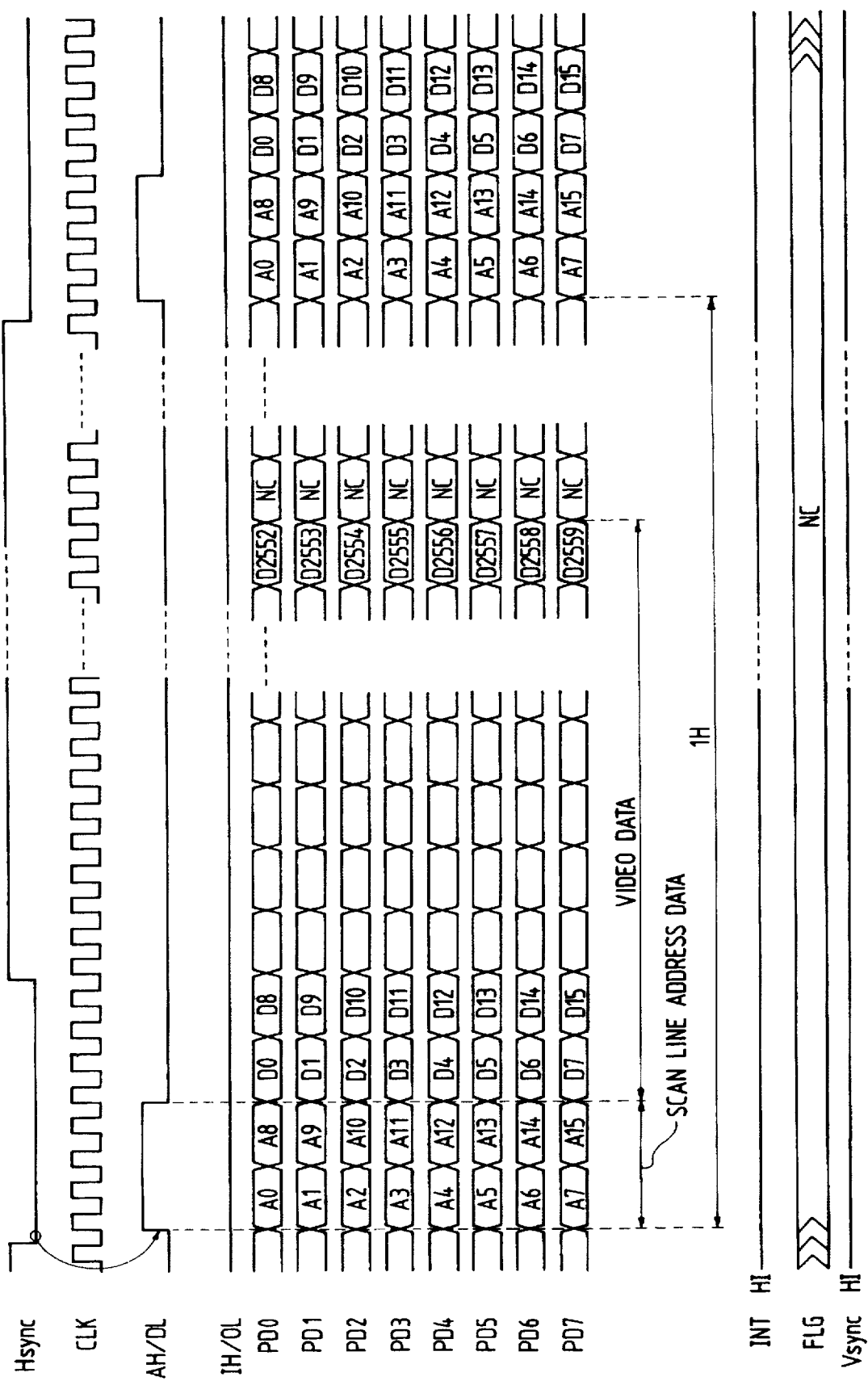
FIG. 4 is a timing chart showing communicating operations in the case where drive data and video data are transferred from a graphics controller on the main apparatus side to the display.

FIG. 4 is a timing chart for the fundamental communication when the display data is sent from the graphics controller 9 side to the FLC display unit controller 8 side of an FLC display unit 1. The operation will now be described.

When the graphics controller 9 detects that the Hsync signal is at the Low level (at the same time, the following conditions must be satisfied: namely, INT=high and Vsync= High and IH/OL=Low), the AH/DL signal is immediately set to the High level, thereby starting the transfer of the display data. The display controller 8 of the FLC display unit 1 sets the Hsync to the High level during the display data transfer period of time. After completion of a series of processes based on the transferred drive data, the controller 8 of the FLC display 1 again sets the Hsync to the Low level and enters the standby mode to receive the next display data.

Figure 5:
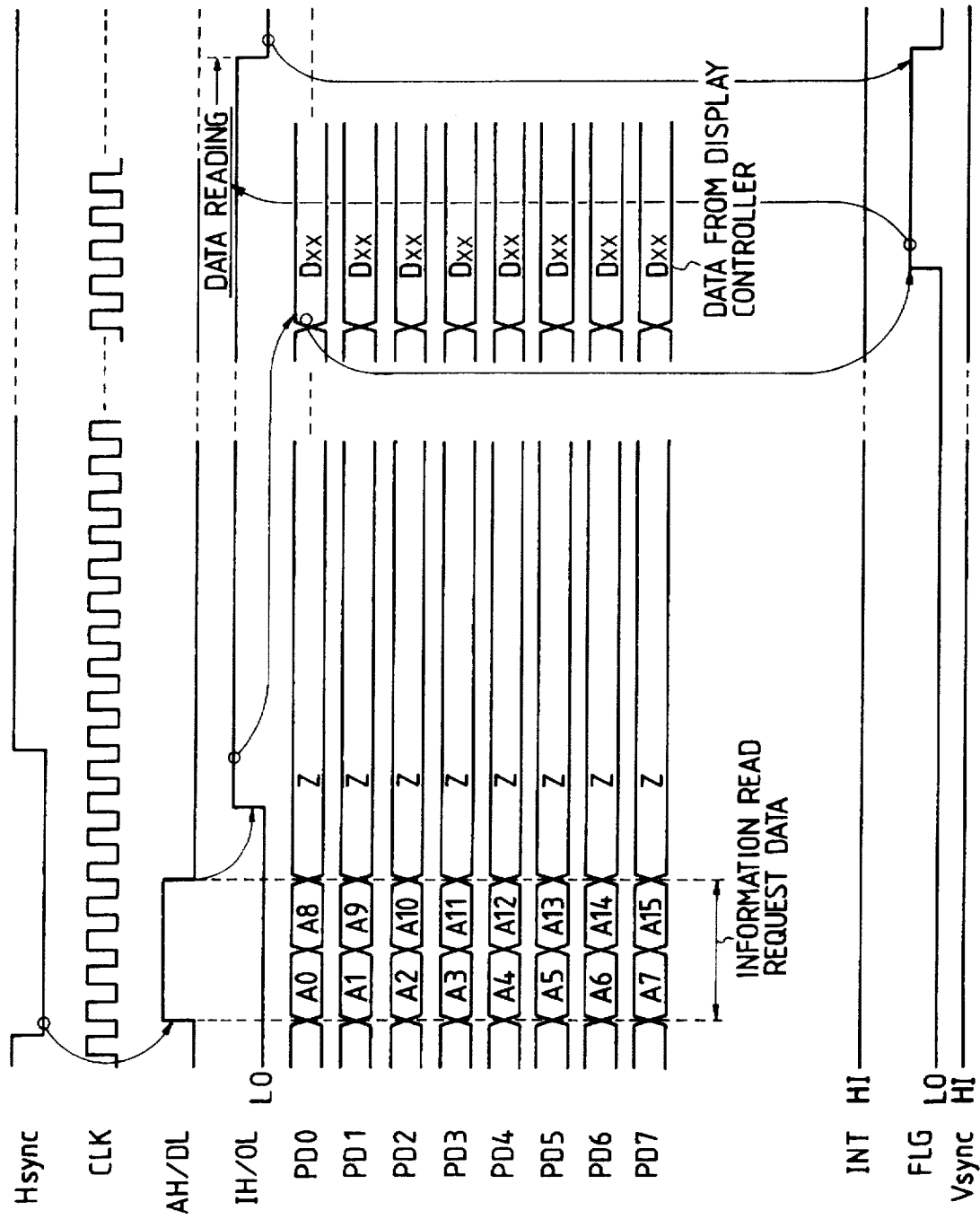
FIG. 5 is a timing chart showing communicating operations in the case where the graphics controller on the main apparatus side reads out the drive data of the display.

FIG. 5 is a timing chart for the fundamental communication when the graphics controller 9 side reads out the display data from the controller 8 side of the FLC display unit 1. The operation will now be described hereinbelow.

First, the graphics controller 9 sends "information read request data" which has been predetermined between the controller 8 of the FLC display unit 1 and the controller 9. Such data acts as the drive data to the controller 8 of the FLC display unit 1 in accord with the timings of $A_0$ to $A_{15}$ in FIG. 5. The graphics controller 9 sets the IH/OL signal to the High level, thereby setting the data input mode. At this time, the data buses $PD_0$ to $PD_7$ are set in the high impedance state (Z) when they are seen from the side of the graphics controller 9. When the controller 8 of the FLC display unit 1 recognizes the "information read request data", it confirms that the IH/OL line is at the High level and, thereafter, the controller 8 sends the data onto the data buses $PD_0$ to $PD_7$ and, further, sets the FLG signal to the High level. When the graphics controller 9 detects that the FLG line is set to the High level, it reads the data then existing on the data buses $PD_0$ to $PD_7$ and stores into the GCPU 14.

(3) Communicating operation in the video display mode

In the video display mode, the display data is sent from the graphics controller 9 side to the display side in a manner similar to the case of the communication in FIG. 4. At this time, the scan line address data is used as the drive data and is sent to the positions of $A_0$ to $A_{15}$ in FIG. 4 and is transferred to the display controller 8.

Explaining in more detail, the scan line address data is extracted by the controller 8 of the FLC display unit 1 and is input to a decoder 7 on the scan line electrode drive circuit side. This in accordance with the timing to drive the designated scan line, so that the designated scan line on the display is selected. On the other hand, the video data is transferred to the shift register 6 on the information electrode drive circuit side and is shifted on an 8-pixel unit basis by transfer clocks (CLK). After completion of the shifting process by one scan line in the horizontal direction by the shift register 6, the video data of 1280 pixels is transferred to a line memory 5 provided for the shift register 6 and is stored for one horizontal scan period of time. After the writing of the video data to the display panel 2 for one predetermined horizontal scan period of time is finished, the controller 8 of the display unit again sets the Hsync to the Low level and receives the display data of the next scan line.

By repeating the above series of communicating operations, the writing operation and the partial writing operation to the display panel screen are executed.

(4) Operation in the display mode setting

Upon setting from the host side

Figure 6:
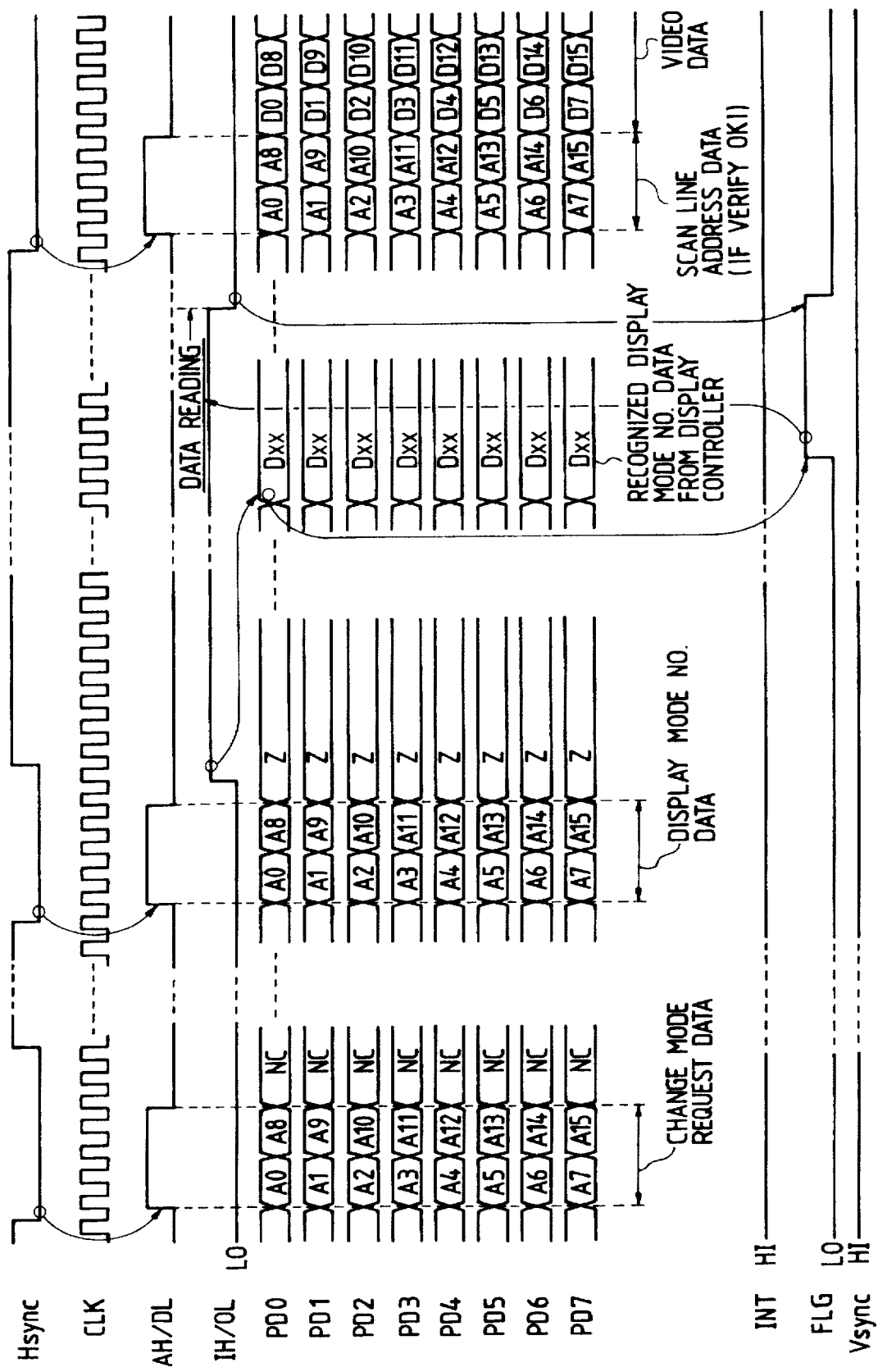
FIG. 6 is a timing chart showing communicating operations in the case where the graphics controller on the main apparatus side switches a display mode of the display.

The display mode for the display is fundamentally set and changed on the basis of a request from the host side and fundamentally in accordance with a timing chart shown in FIG. 6. Explanation will now be made practically hereinbelow.

① When a display mode change request is generated from the host CPU 11 side, the graphics controller 9 sends "display mode change request data" to the drive data portion when the display data is transferred to the controller 8 of the display unit 1 (when the AH/DL line is at the High level, that is, at the timings of $A_0$ to $A_{15}$ in FIG. 6).

② After the controller 8 of the display unit 1 recognizes predetermined "display mode change request data", it sets the Hsync line to the Low level.

③ Then, the graphics controller 9 sends "display mode number" as the drive data to the controller 8 of the display unit 1 in accord with the timing of $A_0$ to $A_{15}$ in FIG. 6 and sets the IH/OL signal to the High level, thereby switching the data buses $PD_0$ to $PD_7$ to the input mode.

④ The controller 8 of the display unit 1 receives the "display mode number" and determines the driving conditions of the display panel in accordance with the display mode. The controller 8 decides the relation between the number of physical pixels and the number of logical pixels and the relation of either one of the color and the number of gradient levels or the relation between both of the color and the number of gradient levels. The controller 8 determines the size of the effective display screen and the size of the external frame portion of the display area in the display screen. The controller 8 decides the relation of either one of the color of the external frame portion and the number of gradient levels or the relation between both of the color of the external frame portion and the number of gradient levels. The controller 8 determines the transfer format or the timing of the data from the image data memory section to the display or both of the transfer format and the timing of such data. In order to confirm that the communication has correctly been executed or not, the controller 8 checks that the IH/OL line is at the High level and, thereafter, sends the received "display mode number" to the data buses $PD_0$ to $PD_7$ and sets the FLG signal to the High level.

⑤ After the graphics controller 9 confirmed that the FLG line was at the High level, it stores the "display mode number" data which was output to the data buses $PD_0$ to $PD_7$ into the GCPU 14.

⑥ The GCPU 14 compares the received data with the "display mode number" which has previously been transferred and, after completion of the confirmation it sets the IH/OL signal to the Low level.

⑦ After the controller 8 of the display unit 1 confirms that the IH/OL line was set to the Low level, it sets the Hsync line to the Low level and waits for the next display data.

⑧ After the graphics controller 9 confirms that the Hsync line was set to the Low level, if a check of the display mode determines it is normal, the graphics controller 9 sends the ordinary scan line address + video data alternatively, if it is abnormal, the graphics controller 9 again sends "display mode change request data" and again executes the processes from step ①.

By the above procedure, the change of the display mode and the drive control of the display panel according to each display mode can be executed.

(5) Operation in the display mode setting

When setting from the display side

For instance, in the case where the graphics controller 9 and the controller 8 of the display unit 1 are contain different power sources and the power source on the side of the controller 8 of the display unit 1 is used with the graphics controller 9 (on the host side), the controller 8 side of the display unit 1 cannot know in which display mode the graphics controller 9 has been operating. In such a case, the controller 8 of the display unit 1 sends the INT signal to the graphics controller 9 and requests to set the display mode. When the graphics controller 9 receives the INT signal from the display unit controller 8, it checks the FLG line. If the FLG line is at the Low level, the graphics controller 9 recognizes a request for display mode set. Subsequently, the display mode is set in accordance with a procedure similar to the case of step (4) for operation after setting of the display mode—the operation upon setting from the host side.

(6) Operation upon temperature data read request

To know the temperature data of the display unit 1 by the host side, a method is used where the graphics controller 9 side in FIG. 5 reads the temperature data as a part of the display data from the controller 8 side of the FLC display unit 1. The operation will be further practically described hereinbelow.

① The graphics controller 9 adds "temperature data read request data" to the drive data portion (when the AH/DL line is at the High level) when the display data is transferred to the display and sets the IH/OL signal to the High level. Thus, the data buses $PD_0$ to $PD_7$ can be switched into the input mode.

② After the controller 8 of the display unit 1 recognizes the predetermined "temperature data read request data", it confirms that the IH/OL line is at the High level. Then, the controller 8 sends the "temperature data" to the data buses $PD_0$ to $PD_7$ and sets the FLG signal to the High level.

③ After the graphics controller 9 confirms that the FLG line was set to the High level, it stores the "temperature data" which was output to the data buses $PD_0$ to $PD_7$ into the GCPU 14.

On the other hand, a read request can be also sent from the display side to the main apparatus as necessary. In such a case, in a manner similar to the case of setting the display mode, the display first sends the INT signal to the graphics controller 9. When the graphics controller 9 receives the INT signal from the display side, it checks the FLG line. If the FLG line is at the High level, the graphics controller 9 recognizes that the reading of the temperature data is requested. After that, the reading process of the temperature data is executed in a manner similar to the case where the request was generated from the main apparatus side.

Table 2 presents the IBM support mode list. There, the alphanumeric mode 1 and graphics mode 2 are defined by the adapter names, characters and resolutions, colors the numbers of gradient levels, and the FLC display drive data. In Table 2, an expression "b/p" is used to decide the color and the number of gradient levels in the output data for the input data. In the video data format stored in the video data storage memory VRAM 10 in FIG. 1, the expression "b/p" represents the color for one pixel (one logical pixel) and the number of bits define the binary expression of the gradient data amount. An expression "ratio" in Table 2 indicates the relation between the number of physical pixels and the number of logical pixels and the relation is shown in FIG. 7. According to the FLC display in the embodiment, two physical pixels having different area ratios are set into one pixel unit. Therefore, when the ratio=1, it corresponds to the minimum one logical pixel construction and the number of expressionable gradient levels is set to 4. (The FLC display is fundamentally a binary expression display and a method in which two physical pixels having different area ratios are set into one pixel unit as mentioned above has already been proposed as one of methods of realizing the multi-value expression by the FLC display, namely, the gradation expression.) When the ratio=2, one logical pixel is constructed by two minimum pixel units based on four physical pixels and the number of gradient levels can be set to 8. Similarly, when the ratio=4, one logical pixel is constructed by four minimum pixel units based on eight physical pixels and the number of gradient levels can be set to 16.

As mentioned above, either one of various display modes is used from the time of the turn-on of the power source and the total control method necessary to change the display mode in accordance with the necessity is set in the ROM. There is provided a control monitor section in which the display mode can be further changed from the host side in accordance with a predetermined required procedure. Thus, it is possible to satisfy the request to support various display modes as in the foregoing Multisync machines by use of the ferroelectric liquid crystal display which also needs the control of drive data, not possible using a conventional method.

The invention is not limited to the ferroelectric liquid crystal display but can be applied to any display system which has a memory characteristic and in which the driving conditions are temperature dependent.

What is claimed is:

1. A display system using a display panel in which signal electrodes and information signal electrodes are arranged in a matrix and a liquid crystal is sandwiched between both of the signal and information signal electrodes, wherein signals and information signals are respectively applied to the signal electrodes and the information signal electrodes to thereby drive said signal and information signal electrodes, said display system comprising:

memory means for storing image data to be displayed by the display panel;

display mode memory means for storing a display mode as a driving condition of the display panel with respect to the image data to be displayed by the display panel;

determining means for determining numbers of vertical and horizontal pixels to display the image data on the display panel, based on the display mode;

read out means for reading out the image data from said memory means; and display control means for displaying data of one pixel of the read out image data to plural pixels of the display panel, based on said numbers of vertical and horizontal pixels and numbers of vertical and horizontal pixels of the display panel, and wherein said image data and a scan line address of the image data are provided in accordance with the display mode, the scan line address identifying a specific scan line of the display panel where the image data is to be displayed, and the display being performed by the signal electrodes driven on the basis of the image data.

2. A system according to claim 1, wherein said display control means comprises external frame portion display control means for controlling the display of an external frame portion of an effective display area of the display panel.

3. A system according to claim 1, wherein said display control means determines the driving conditions of the display panel upon turn-on or resetting of a power source of the display system.

4. A system according to claim 1, wherein said display control means determines an unconditional relation between the number of physical pixels and the number of logical pixels of the display panel as the driving condition upon turn-on or resetting of a power source of the display system.

5. A system according to claim 1, wherein said display control means determines a relation of either one of a color of the image data which is input and the number of gradient levels for the display panel or a relation of both of said color and said number of gradient levels as the driving condition upon turn-on and resetting of a power source of the display system.

6. A system according to claim 1, wherein said display control means determines a transfer format or a transfer timing of the image data from the memory means to the display panel or both of said transfer format and said transfer timing as the driving condition upon turn-on or resetting of a power source of the display system.

7. A system according to claim 1, further comprising means for transmitting a command to determine a desired driving condition to said display control means.

8. A system according to claim 1, further comprising means for detecting the turn-on, resetting, or turn-off of a power source and for informing said display control means.

9. A system according to claim 1, wherein at least resolutions, colors which can be displayed by the display panel, and character sizes are stored in said display mode memory means.

10. A system according to claim 1, wherein the liquid crystal sandwiched in the display panel has a temperature dependency whose characteristics change depending on an environmental temperature, and wherein said display control means changes the driving conditions of the display panel in accordance with the environmental temperature.

11. A system according to claim 1, wherein said display control means of the display system is responsive to a host control means of a computer unit and wherein the display mode stored in said display mode memory means is read out by the host control means and is transferred to said display control means.

12. A system according to claim 1, wherein said liquid crystal comprises a ferroelectric liquid crystal having a memory characteristic.

13. A display system connected to a host side, said system comprising:

a display panel comprising scanning signal electrodes and information signal electrodes arranged in a matrix and a liquid crystal sandwiched between said scanning signal and information signal electrodes;

memory means for storing image data to be displayed by said display panel;

display mode memory means for storing a display mode as a driving condition of the display panel with respect to the image data to be displayed by said display panel, the display mode having been transferred from the host side;

determining means for determining numbers of vertical and horizontal pixels to display the image data on the display panel, based on the display mode;

read out means for reading out the image data from said memory means, display control means for displaying data of one pixel of the read out image data to plural pixels of the display panel, based on said numbers of vertical and horizontal pixels and numbers of vertical and horizontal pixels of the display panel; and area setting means for obtaining a display area and a non-display area in accordance with the display mode, wherein said display control means controls the display panel in accordance with the obtained display and non-display areas, the display being performed by the signal electrodes driven on the basis of the image data.

14. A system according to claim 13, wherein said display control means comprises external frame portion display control means for controlling a display of an external frame portion of an effective display area of said display panel.

15. A system according to claim 13, wherein said display control means determines the driving conditions of said display panel upon turn-on or resetting of a power source of said display system.

16. A system according to claim 13, wherein said display control means determines an unconditional relation between the number of physical pixels and the number of logical pixels of said display panel as the driving condition upon turn-on or resetting of a power source of said display system.

17. A system according to claim 13, wherein said display control means determines a relation of either one of a color and the number of gradient levels of the image data which is input to said display panel or a relation between both of the color and the number of gradient levels as the driving condition upon turn-on and resetting of a power source of said display system.

18. A system according to claim 13, wherein said display control means determines a transfer format or a transfer timing of the image data from said memory means to said display panel or both of the transfer format and the transfer timing as the driving condition upon turn-on or resetting of a power source of said display system.

19. A system according to claim 13, further comprising means for transmitting a command to determine a desired driving condition to said display control means.

20. A system according to claim 13, further comprising means for detecting a turn-on, resetting, or turn-off of a power source and informing said display control means.

21. A system according to claim 13, wherein at least resolutions, colors which can be displayed by said display panel, and character sizes are stored in said display mode memory means.

22. A system according to claim 13, wherein the liquid crystal sandwiched by said display panel has a temperature dependency whose characteristics change depending on an environmental temperature, and wherein said drive control means changes the driving conditions of said display panel in accordance with the environmental temperature.

23. A system according to claim 13, wherein said display control means of said display system is responsive to a host control means of a computer unit and the display mode stored in said display mode memory means is read out by the host control means and is transferred to said display control means.

24. A display system connected to a host computer, wherein signal and information signals are respectively supplied to signal electrodes and information signal electrodes of a display panel to thereby drive both of said signal and information signal electrode the display panel comprise the signal electrodes and the information signal electrodes arranged in a matrix and sandwiching a liquid crystal with a temperature dependency whose characteristics change depending on an environmental temperature between both of the signal and information signal electrodes, said display system comprising:

driving condition control means for controlling driving conditions in accordance with the environmental temperature;

memory means for storing image data to be displayed by the display panel through a signal line from the host computer;

display mode memory means for storing a display mode as the driving condition of the display panel with respect to the image data to be displayed by the display panel, information representing the display mode being transferred from the host computer to the display memory means;

determining means for determining numbers of vertical and horizontal pixels to display the image data on the display panel, based on the display mode; and display control means for reading out the image data to be displayed from said memory means, for controlling said drive control means in accordance with the display mode stored in said display mode memory means, and for displaying data of one pixel of the read out image data to plural pixels of the display panel, based on said numbers of vertical and horizontal pixels and numbers of vertical and horizontal pixels of the display panel, wherein said display control means transfers temperature information to said host computer through the signal line.

25. A system according to claim 24, wherein said display control means comprises external frame portion display control means for controlling a display of an external frame portion of an effective display area of the display panel.

26. A system according to claim 24, wherein said display control means determines the driving conditions of the display panel upon turn-on or resetting of a power source of said display system.

27. A system according to claim 24, wherein said display control means determines an unconditional relation between a number of physical pixels and a number of logical pixels of the display panel as the driving condition upon turn-on or resetting of a power source of said display system.

28. A system according to claim 24, wherein said display control means determines a relation of either a color and a number of gradient levels of the image data which is input to the display panel or a relation between both of the color and the number of gradient levels as the driving condition upon turn-on and resetting of a power source of said display system.

29. A system according to claim 24, wherein said display control means determines a transfer format or a transfer timing of the image data from said memory means to the display panel or both of the transfer format and the transfer timing as the driving condition upon turn-on or resetting of a power source of said display system.

30. A system according to claim 24, further comprising means for detecting a turn-on, resetting, or turn-off of a power source and informing said display control means.

31. A system according to claim 24, wherein at least resolutions, colors which can be displayed by the display panel, and character sizes are stored in said display mode memory means.

32. A system according to claim 24, wherein the liquid crystal sandwiched by the display panel has a temperature dependency whose characteristics change depending on an environmental temperature, and wherein said display control means changes the driving conditions of the display panel in accordance with the environmental temperature.

33. A system according to claim 24, wherein said display control means of the display system is responsive to a host control means of a computer unit and wherein the display mode stored in said display mode memory means is read out by the host control means and is transferred to the display control means.

34. A system according to claim 24, wherein the liquid crystal comprises a ferroelectric liquid crystal have a memory characteristic.

35. A system according to claim 24, wherein on the basis of a turn-on or a turn-off of a power source of the host computer, said display control means controls said drive control means and sets a display state of the display panel into an ON or OFF state and, thereafter, turns ON or OFF a power source of a main body of the display system.

36. A display system connected to a host side, said system comprising:

a display panel comprising scanning signal electrodes and information signal electrodes arranged in a matrix and a liquid crystal sandwiched between said scanning and information signal electrodes;

memory means for storing image data to be displayed by said display panel;

display mode memory means for storing a display mode as a driving condition of said display panel with respect to the image data to be displayed by said display panel, the display mode having been transferred from the host side;

determining means for determining numbers of vertical and horizontal pixels to display the image data on said display panel, based on the display mode;

display control means for displaying data of one pixel of the image data stored in said memory means to plural pixels of said display panel, based on said numbers of vertical and horizontal pixels and numbers of vertical and horizontal pixels of said display panel; and display mode control means for determining whether said display mode stored in said display mode memory coincides with a changed display mode in the case of changing the display mode, wherein said display control means changes a frame frequency for said display panel in accordance with said display mode.

37. A display system connected to a host side and using a display panel in which signal electrodes and information signal electrodes are arranged in a matrix and a liquid crystal is sandwiched between the signal and information signal electrodes, wherein signals and information signals are respectively applied to the signal electrodes and the information signal electrodes to thereby drive the electrodes, said display system comprising:

memory means for storing image data to be displayed by the display panel;

display mode memory means for storing a display mode as a driving condition of the display panel with respect to the image data to be displayed by the display panel, the display mode having a been transferred from the host side;

determining means for determining numbers of vertical and horizontal pixels to display the image data on the display panel, based on the display mode;

display control means for reading out the image data to be displayed from said memory means, and for displaying data of one pixel of the image data stored in said memory means to plural pixels of the display panel, based on said numbers of vertical and horizontal pixels and numbers of vertical and horizontal pixels of the display panel; and display mode control means for determining whether the display mode stored in said display mode memory means coincides with a changed display mode in the case of changing the display mode, wherein said display control means changes a frame frequency for the display panel in accordance with the display mode.

38. A display control apparatus connected to a host side for controlling a display in correspondence with a plurality of display modes, said apparatus comprising:

transfer means for transferring image information read out from a memory and mode change information from the host side;

determining means for determining whether the information transferred by said transfer means is the image information or the mode change information;

change means for changing a display mode of the display based on the mode change information when the information transferred by said transfer means is the mode change information;

determining means for determining numbers of vertical and horizontal pixels to display the image information on the display, based on the display mode: and display drive means for displaying one pixel of the image information to plural pixels of the display based on said numbers of vertical and horizontal pixels and number of vertical and horizontal pixels of the display when the information transferred by said transfer means is the image information.

39. A display control apparatus according to claim 38, wherein the display comprises a ferroelectric liquid crystal.

40. A display control apparatus according to claim 38, wherein the mode change information comprises a mode number.

41. A display control apparatus according to claim 38, wherein the image information comprises display position information.

42. A display control method for controlling a display connected to a host side in accordance with a plurality of display modes, said method comprising the steps of:

transferring image information read out from a memory and mode change information from the host side;

determining whether information transferred by said transferring means is the image information or the mode change information;

changing a display mode of the display based on the mode change information when the information transferred is the mode change information;

determining numbers of vertical and horizontal pixels to display the image data on the display panel, based on the display mode; and displaying one pixel the image information to plural pixels of the display based on the numbers of vertical and horizontal pixels and numbers of vertical and horizontal pixels of the display when the information transferred is the image information.

43. A display control method for controlling a display panel in which signal electrodes and information signal electrodes are arranged in a matrix and a liquid crystal is sandwiched between both of the signal and information signal electrodes, wherein signals and information signals are respectively applied to the signal electrodes and the information signal electrodes to thereby drive the signal and information signal electrodes, the display control method comprising the steps of:

storing image data to be displayed by the display panel in memory means;

storing a display mode, in a display mode memory, as a driving condition of the display panel with respect to the image data to be displayed by the display panel;

determining numbers of vertical and horizontal pixels to display the image data on the display panel, based on the display mode;

reading out the image data to be displayed from the memory means, and displaying data of one pixel of the image data stored in the memory means to plural pixels of the the display panel, based on the numbers of vertical and horizontal pixels and numbers of vertical and horizontal pixels of the display panel; and providing image data and a scan line address of the image data in accordance with the display mode, the scan line address identifying a specific scan line of the display panel where the image data is to be displayed, and the display being performed by the signal electrodes driven on the basis of the image data.

44. A display control method for controlling a display panel connected to a host side, the display panel having scanning signal electrodes and information signal electrodes arranged in a matrix and a liquid crystal sandwiched between the scanning and information signal electrodes, said method comprising the steps of:

storing image data to be displayed by the display panel in a memory;

storing a display mode, in a display mode memory, as a driving condition of the display panel with respect to the image data to be displayed by the display panel, the display mode having been transferred from the host side;

determining numbers of vertical and horizontal pixels to display the image data on the display panel, based on the display mode;

reading out the image data from the memory;

displaying data of one pixel of the read out image data to plural pixels of the display panel based on the numbers of vertical and horizontal pixels and numbers of vertical and horizontal pixels of the display panel;

determining whether the display mode stored in the display mode memory coincides with a changed display mode in the case of a changing the display mode; and changing a frame frequency for the display panel in accordance with the display mode.

* * * * *

UNITED STATES PATENT AND TRADEMARK OFFICE
CERTIFICATE OF CORRECTION

PATENT NO.   : 5,784,037
DATED        : July 21, 1998
INVENTOR(S)  : HIROSHI INOUE Page 1 of 4

It is certified that error appears in the above-identified patent and that said Letters Patent is hereby corrected as shown below:

COLUMN 1

Line 30, "konwn" should read --known--;
Line 58, "is pro-" should be deleted;
Line 59, "posed" should be deleted.

COLUMN 2

Line 45, "Further, in the case" should read --Further, a case may occur--;
Line 48, "monochrome" should read --the--;
Line 49, "the" should read --monochrome--.

COLUMN 3

Line 24, "if the user desires" should read --the user may desire--;
Line 48, "Unless otherwise," should read --Otherwise--;
Line 59, "is" should read --that have been--.

UNITED STATES PATENT AND TRADEMARK OFFICE
CERTIFICATE OF CORRECTION

PATENT NO. : 5,784,037
DATED      : July 21, 1998
INVENTOR(S) : HIROSHI INOUE

Page 2 of 4

It is certified that error appears in the above-identified patent and that said Letters Patent is hereby corrected as shown below:

COLUMN 4

Line 3, "prolonged" should read --an--;
    Line 4, "an" should read --prolonged--.

COLUMN 5

Line 29, "4," should read --4--;
    Line 30, "101" should read --101,--;
    Line 52, "herein-below" should read --hereinbelow--.

COLUMN 6
    Line 15, "operaiton" should read --operation--;
    Line 26, "operative" should read --operation--.

COLUMN 7

Line 38, "in" should read --is in--.

UNITED STATES PATENT AND TRADEMARK OFFICE
CERTIFICATE OF CORRECTION

PATENT NO. : 5,784,037
DATED : July 21, 1998
INVENTOR(S) : HIROSHI INOUE

It is certified that error appears in the above-identified patent and that said Letters Patent is hereby corrected as shown below:

COLUMN 8

Line 31, "confirmed" should read --confirms--;
    Line 45, "data" should read --data;--;
    Line 55, "are" should be deleted.

COLUMN 9

Line 39, "colors" should read --colors,--.

COLUMN 13

Line 55, "have" should read --having--.

COLUMN 14

Line 39, "a" should be deleted.

COLUMN 15

Line 37, "one pixel" should read --data of one pixel of--.

UNITED STATES PATENT AND TRADEMARK OFFICE
CERTIFICATE OF CORRECTION

PATENT NO. : 5,784,037
DATED : July 21, 1998
INVENTOR(S) : HIROSHI INOUE

It is certified that error appears in the above-identified patent and that said Letters Patent is hereby corrected as shown below:

COLUMN 16

Line 12, "the the" should read --the--.

Signed and Sealed this

Twenty-second Day of June, 1999

Attest:

Q. TODD DICKINSON

Attesting Officer     Acting Commissioner of Patents and Trademarks